United States Patent
Whitby-Strevens

(10) Patent No.: US 10,432,435 B2
(45) Date of Patent: Oct. 1, 2019

(54) METHODS AND APPARATUS FOR ENABLING AND DISABLING SCRAMBLING OF CONTROL SYMBOLS

(71) Applicant: Apple Inc., Cupertino, CA (US)

(72) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/985,516

(22) Filed: May 21, 2018

(65) Prior Publication Data

US 2018/0375695 A1    Dec. 27, 2018

Related U.S. Application Data

(62) Division of application No. 15/269,831, filed on Sep. 19, 2016, now Pat. No. 9,979,570, which is a division of application No. 14/168,633, filed on Jan. 30, 2014, now Pat. No. 9,450,790.

(60) Provisional application No. 61/759,311, filed on Jan. 31, 2013.

(51) Int. Cl.
   *H04L 25/03* (2006.01)
   *H04L 25/08* (2006.01)
   *G09G 5/00* (2006.01)
   *H04N 21/4363* (2011.01)

(52) U.S. Cl.
   CPC ....... *H04L 25/03866* (2013.01); *G09G 5/006* (2013.01); *H04L 25/08* (2013.01); *H04N 21/43635* (2013.01); *G09G 2330/06* (2013.01); *G09G 2370/12* (2013.01)

(58) Field of Classification Search
   CPC ................................................ H04L 25/03866
   USPC ......................................................... 375/257
   See application file for complete search history.

(56) References Cited

U.S. PATENT DOCUMENTS

| | | |
|---|---|---|
| 3,902,117 A | 8/1975 | Sheppard |
| 4,523,181 A | 6/1985 | Tazaki et al. |
| 4,791,407 A | 12/1988 | Prucnal et al. |
| 5,224,096 A | 6/1993 | Onishi et al. |
| 5,461,426 A | 10/1995 | Limberg et al. |
| 5,961,680 A | 10/1999 | Wooldridge |

(Continued)

FOREIGN PATENT DOCUMENTS

| | | |
|---|---|---|
| CN | 101573873 A | 11/2009 |
| CN | 102290024 A | 12/2011 |

(Continued)

OTHER PUBLICATIONS

Display Port Standard Version 1.1 (Mar. 19, 2007) (VESA, www.vesa.org).

(Continued)

*Primary Examiner* — Lihong Yu
(74) *Attorney, Agent, or Firm* — Gazdzinski & Associates, PC

(57) ABSTRACT

Methods and apparatus for the selection and/or configuration of scrambling operations to accommodate e.g., both scrambling and non-scrambling connections (such as to e.g., legacy type devices). In one embodiment, media interface devices (such as e.g., HDMI (High-Definition Multimedia Interface)) devices may provide enhanced scrambling capabilities; solutions disclosed herein provide, among other things, support for both enhanced scrambling capable devices and legacy devices, and enable a device to determine the scrambling capabilities of a connected device.

20 Claims, 8 Drawing Sheets

(56) References Cited

U.S. PATENT DOCUMENTS

| | | |
|---|---|---|
| 6,078,532 A | 6/2000 | Rivers et al. |
| 6,222,891 B1 | 4/2001 | Liu et al. |
| 6,381,332 B1 | 4/2002 | Glaab |
| 6,426,780 B1 | 7/2002 | Limberg et al. |
| 6,516,437 B1 | 2/2003 | Van Stralen et al. |
| 6,574,731 B1 | 6/2003 | Coles et al. |
| 6,597,743 B1 | 7/2003 | Khayrallah et al. |
| 6,618,395 B1 | 9/2003 | Kimmitt |
| 6,654,926 B1 | 11/2003 | Raphaeli et al. |
| 6,775,334 B1 | 8/2004 | Liu et al. |
| 6,870,930 B1 | 3/2005 | Kim et al. |
| 7,062,687 B1 | 6/2006 | Gfeller et al. |
| 7,062,689 B2 | 6/2006 | Slobodnik |
| 7,257,163 B2 | 8/2007 | Hwang et al. |
| 7,359,437 B2 | 4/2008 | Hwang et al. |
| 7,365,575 B2 | 4/2008 | Kim |
| 7,394,406 B2 | 7/2008 | Pasqualino |
| 7,403,486 B2 | 7/2008 | Flask |
| 7,460,031 B2 | 12/2008 | Yeo et al. |
| 7,561,074 B2 | 7/2009 | Pasqualino |
| 7,573,596 B2 | 8/2009 | Owen |
| 7,639,687 B1 | 12/2009 | Tsai et al. |
| 7,672,285 B2 | 3/2010 | Sun et al. |
| 7,773,752 B2 | 8/2010 | Noh et al. |
| 7,961,880 B2 | 6/2011 | Wang et al. |
| 8,000,404 B2 | 8/2011 | Talbot et al. |
| 8,139,660 B2 | 3/2012 | Anigstein et al. |
| 8,253,605 B2 | 8/2012 | Rivoir |
| 8,325,699 B2 | 12/2012 | Sun et al. |
| 8,432,791 B1 | 4/2013 | Masters |
| 8,588,287 B2 | 11/2013 | Chen et al. |
| 8,644,504 B2 | 2/2014 | Choi |
| 8,650,010 B2 | 2/2014 | M et al. |
| 8,678,860 B2 | 3/2014 | Minich et al. |
| 8,733,650 B1 | 5/2014 | Segal et al. |
| 8,737,625 B2 | 5/2014 | Ikeda et al. |
| 8,750,176 B2 | 6/2014 | Whitby-Strevens |
| 8,838,822 B2 | 9/2014 | Spalla et al. |
| 8,917,194 B2 | 12/2014 | Whitby-Strevens |
| 8,949,493 B1 | 2/2015 | Wortman et al. |
| 9,166,623 B1 | 10/2015 | Bates et al. |
| 9,484,954 B1 | 11/2016 | Gopal et al. |
| 2001/0022813 A1 | 9/2001 | Tan et al. |
| 2002/0051562 A1 | 5/2002 | Sheppard et al. |
| 2002/0138721 A1 | 9/2002 | Kwon et al. |
| 2002/0159553 A1 | 10/2002 | McCarty et al. |
| 2003/0005436 A1 | 1/2003 | Naganuma |
| 2003/0043141 A1 | 3/2003 | Bae et al. |
| 2003/0048851 A1 | 3/2003 | Hwang et al. |
| 2003/0048852 A1 | 3/2003 | Hwang et al. |
| 2003/0165182 A1 | 9/2003 | O'Farrell |
| 2003/0168512 A1 | 9/2003 | Longacre et al. |
| 2003/0214507 A1 | 11/2003 | Mawatari et al. |
| 2004/0002312 A1 | 1/2004 | Li et al. |
| 2004/0071158 A1 | 4/2004 | Wei |
| 2004/0071221 A1 | 4/2004 | Nakada et al. |
| 2004/0088633 A1 | 5/2004 | Lida et al. |
| 2004/0103363 A1 | 5/2004 | Kim et al. |
| 2004/0131025 A1 | 7/2004 | Dohler et al. |
| 2005/0012592 A1 | 1/2005 | Debelleix |
| 2005/0175122 A1 | 8/2005 | Nefedov et al. |
| 2005/0185796 A1 | 8/2005 | Lablans |
| 2005/0286643 A1 | 12/2005 | Ozawa et al. |
| 2006/0062467 A1 | 3/2006 | Zou et al. |
| 2006/0095613 A1 | 5/2006 | Venkata et al. |
| 2006/0117125 A1 | 6/2006 | Tseng |
| 2006/0176941 A1 | 8/2006 | Nieto et al. |
| 2006/0176983 A1 | 8/2006 | Wadsworth et al. |
| 2006/0190589 A1 | 8/2006 | Parker et al. |
| 2006/0203900 A1 | 9/2006 | Koralek et al. |
| 2006/0250628 A1 | 11/2006 | Owen |
| 2007/0016778 A1 | 1/2007 | Lyle |
| 2007/0016779 A1 | 1/2007 | Lyle |
| 2007/0074242 A1 | 3/2007 | Wang et al. |
| 2007/0107034 A1 | 5/2007 | Gotwals |
| 2007/0116055 A1 | 5/2007 | Atsumi et al. |
| 2007/0139232 A1 | 6/2007 | Venkata et al. |
| 2007/0153930 A1 | 7/2007 | Reid |
| 2007/0192664 A1 | 8/2007 | Ogawa et al. |
| 2007/0204204 A1 | 8/2007 | Sul et al. |
| 2007/0206638 A1 | 9/2007 | Santoru et al. |
| 2007/0206642 A1 | 9/2007 | Egan et al. |
| 2007/0220279 A1 | 9/2007 | Northcutt et al. |
| 2007/0230687 A1 | 10/2007 | Talbot et al. |
| 2007/0237332 A1 | 10/2007 | Lyle |
| 2007/0242764 A1 | 10/2007 | Anigstein et al. |
| 2007/0257923 A1 | 11/2007 | Whitby-Strevens |
| 2008/0024334 A1 | 1/2008 | Grivna |
| 2008/0046728 A1 | 2/2008 | Lyle |
| 2008/0095218 A1 | 4/2008 | Murray et al. |
| 2008/0123764 A1 | 5/2008 | McNamara et al. |
| 2008/0178062 A1 | 7/2008 | Norris et al. |
| 2008/0178063 A1 | 7/2008 | Norris et al. |
| 2008/0180287 A1 | 7/2008 | Widmer |
| 2008/0186545 A1 | 8/2008 | Meier et al. |
| 2008/0204285 A1 | 8/2008 | Carter et al. |
| 2008/0215934 A1 | 9/2008 | Liu |
| 2008/0235551 A1 | 9/2008 | Lin |
| 2008/0252497 A1 | 10/2008 | Widmer |
| 2008/0258945 A1 | 10/2008 | Widmer |
| 2008/0263621 A1 | 10/2008 | Austerlitz et al. |
| 2008/0273602 A1 | 11/2008 | Glen et al. |
| 2008/0304596 A1 | 12/2008 | Tan et al. |
| 2009/0010318 A1 | 1/2009 | Belogolovyi et al. |
| 2009/0024756 A1 | 1/2009 | Spalla et al. |
| 2009/0147864 A1 | 6/2009 | Lida et al. |
| 2009/0185565 A1 | 7/2009 | Diab et al. |
| 2009/0195506 A1 | 8/2009 | Geidl et al. |
| 2010/0057556 A1 | 3/2010 | Rousso et al. |
| 2010/0067693 A1 | 3/2010 | Courington et al. |
| 2010/0074350 A1 | 3/2010 | Malladi et al. |
| 2010/0118795 A1 | 5/2010 | Hassan |
| 2010/0128816 A1 | 5/2010 | Sun et al. |
| 2010/0238951 A1 | 9/2010 | Ozawa |
| 2010/0262893 A1 | 10/2010 | Carter et al. |
| 2010/0322340 A1 | 12/2010 | Bohm |
| 2011/0026414 A1 | 2/2011 | Banerjee |
| 2011/0122142 A1 | 5/2011 | Wyatt et al. |
| 2011/0145676 A1 | 6/2011 | Nicholson |
| 2011/0188613 A1 | 8/2011 | Dowling et al. |
| 2011/0208954 A1 | 8/2011 | Barrett et al. |
| 2011/0246840 A1 | 10/2011 | Khoshnevis et al. |
| 2011/0310296 A1 | 12/2011 | Lee et al. |
| 2011/0320905 A1 | 12/2011 | Lin et al. |
| 2012/0084559 A1 | 4/2012 | Bonicatto |
| 2012/0139593 A1 | 6/2012 | Saito et al. |
| 2012/0146989 A1 | 6/2012 | Whitby-Strevens |
| 2012/0147274 A1 | 6/2012 | Hassan et al. |
| 2012/0163490 A1 | 6/2012 | Whitby-Strevens |
| 2012/0188951 A1 | 7/2012 | He et al. |
| 2012/0195357 A1 | 8/2012 | Chen et al. |
| 2013/0195160 A1 | 8/2013 | Whitby-Strevens |
| 2013/0195218 A1 | 8/2013 | Whitby-Strevens et al. |
| 2014/0219368 A1 | 8/2014 | Whitby-Strevens et al. |
| 2014/0321575 A1 | 10/2014 | Asakura et al. |
| 2014/0344650 A1 | 11/2014 | Au |
| 2015/0156186 A1 | 6/2015 | Jeffrey |
| 2015/0188576 A1 | 7/2015 | Lim et al. |
| 2015/0215312 A1 | 7/2015 | Cesnik |
| 2015/0244394 A1 | 8/2015 | Wang et al. |
| 2015/0256522 A1 | 9/2015 | Jeffrey |
| 2016/0127053 A1 | 5/2016 | Ganter |

FOREIGN PATENT DOCUMENTS

| | | |
|---|---|---|
| EP | 1517295 A2 | 3/2005 |
| EP | 1940034 A1 | 7/2008 |
| EP | 2490473 A1 | 8/2012 |
| EP | 2807780 A2 | 12/2014 |
| KR | 20070092676 A | 9/2007 |
| WO | WO-03058826 A2 | 7/2003 |
| WO | WO-2011044793 A1 | 4/2011 |

(56) References Cited

FOREIGN PATENT DOCUMENTS

| WO | WO-2012087973 A1 | 6/2012 |
| WO | WO-2013112926 A2 | 8/2013 |
| WO | WO-2013112930 A2 | 8/2013 |

OTHER PUBLICATIONS

IEEE Standard fora High-Performance Serial Bus, IEEE Computer Society, Oct. 21, 2008.
Lindh, et al., "Block Codes in Forward Error Correction," HA14NOK1A, Sophia Antipolis, France, 1999, XP017699860 (16 pages).
NXP: "Technical Analysis of the JEDEC JESD204A Data Converter Interface", Jun. 1, 2009 (Jun. 1, 2009), XP055070699, Retrieved from Internet: URL:http://www.nxp.com/wcmadocuments/newsklownload-media/publications/technical_whitepaper final.pdf retrieved on Jul. 10, 2013 section 3.2 last but one par. p. 12 2nd par. p. 3; figure 4.
Mandin "Scrambling in 10G Ethernet and applicability to 10G EPON" IEEE Draft; PDF00004, IEEE-SA, Piscataway, NJ USA, vol. 802.3av; 802.3.10GEPON_study, Nov. 15, 2006 (Nov. 15, 2016), pp. 1-10, XP068056733, [retrieved on Nov. 15, 2016].
Stein, Digital Signal Processing, a Computer Science Perspective, 2000, John Wiley & Sons Inc., pp. 712-713.
Video Electronics Standards Association: "Display port Standard Version 1.1 ", Mar. 19, 2007, pp. 1-228.
Widmer, A. X., Franaszek, PA., "A DC/Balanced, Partitioned/Block, 8B/10B Transmission Code", IBM "I_ RES. Develop, vol. 27, No. 5, Sep. 1983, pp. 440-451.

METHODS AND APPARATUS FOR ENABLING AND DISABLING SCRAMBLING OF CONTROL SYMBOLS

PRIORITY

This application is a divisional of, and claims the benefit of priority to, co-owned U.S. patent application Ser. No. 15/269,831 of the same title filed Sep. 19, 2016, and issuing as U.S. Pat. No. 9,979,570 on May 22, 2018, which is a divisional of, and claims the benefit of priority to co-owned U.S. patent application Ser. No. 14/168,633 of the same title filed Jan. 30, 2014, issued as U.S. Pat. No. 9,450,790 on Sep. 20, 2016, which claims the benefit of priority to U.S. Provisional Patent Application Ser. No. 61/759,311 filed on Jan. 31, 2013 of the same title, each of the foregoing being incorporated herein by reference in its entirety.

RELATED APPLICATIONS

This application is related to co-owned, co-pending U.S. patent application Ser. No. 13/747,264, filed Jan. 22, 2013 and entitled "METHODS AND APPARATUS FOR THE INTELLIGENT SCRAMBLING OF CONTROL SYMBOLS", Ser. No. 12/976,274 filed Dec. 22, 2010 and entitled "METHODS AND APPARATUS FOR THE INTELLIGENT ASSOCIATION OF CONTROL SYMBOLS", and Ser. No. 13/747,383 filed Jan. 22, 2013 and entitled "METHODS AND APPARATUS FOR ERROR RATE ESTIMATION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networking and telecommunications. More particularly, in one exemplary aspect, the present disclosure is directed to the intelligent configuration of scrambling operation to accommodate e.g., both scrambling and non-scrambling connections (such as to e.g., legacy type devices).

2. Description of Related Technology

HDMI (High-Definition Multimedia Interface) (see, inter alia, www.hdmi.org) is an exemplary dominant digital audio/video interface technology specified by the HDMI Founders. Current incarnations of the standard specify support for simple networking of digital audio/visual (A/V) interconnects, intended to be used primarily between an arbitrary assembly of multimedia "sources" (e.g., set-top boxes, DVD players, Blu-ray Disc players, video game consoles, computers or CPUs) and "sinks" (e.g., display monitors, home-theater system, etc.). This interconnection is generally unidirectional in nature; i.e., from source to sink, in current implementations.

As a brief aside, the current revision of HDMI (HDMI 1.4) utilizes TMDS (Transition Minimized Differential Signaling) to transmit video, audio and auxiliary data over three main HDMI data lanes via one of three modes. FIG. 1 illustrates these TMDS modes in an exemplary 720×480p video frame. The three modes include: (1) a video data period in which the pixels of an active video line are transmitted; (2) a data island period in which audio and auxiliary data are transmitted; and (3) a control period which occurs between video and data island periods. HDMI utilizes TMDS in order to send 10-bit characters that are transmission minimized encoded.

During control periods, control symbols are transmitted repeatedly on the three HDMI main data lanes. HDMI defines four control symbols, representing the four values 0b00, 0b01, 0b10 and 0b11. The value transmitted on lane zero represents whether HSYNC, VSYNC, both or neither is/are being transmitted, and the values transmitted on lanes 1 and 2 are set to non-zero during preambles. Preambles are constructed from eight identical control symbols and are used to signify imminent transitions to data island periods or video data periods. Table 1 illustrates the preambles used for each data period type (i.e., TMDS mode).

TABLE 1

| CTL0 | CTL1 | CTL2 | CTL3 | Data Period Type |
|---|---|---|---|---|
| 1 | 0 | 0 | 0 | Video Data Period |
| 1 | 0 | 1 | 0 | Data Island Period |

Additionally, Table 2 illustrates the control signal-assignment on each of the three main TMDS channels.

TABLE 2

| TMDS Channel (Lane) | D0 | D1 |
|---|---|---|
| 0 | HSYNC | VSYNC |
| 1 | CTL0 | CTL1 |
| 2 | CTL2 | CTL3 |

The two control signals used for each of the TMDS channels are encoded into ten-bit codes as follows:
  case (D1, D0):
    0,0: q_out [9:0]=0b1101010100;
    0,1: q_out [9:0]=0b00101011;
    1,0: q_out [9:0]=0b01010100;
    1,1: q_out [9:0]=0b010101011;
  endcase;

As can be seen from above, these ten-bit codes used for the four control symbols have predominant clock pattern content (i.e., a significant amount of transmissions of 0101 bit-pattern sequences). Furthermore, the control symbols for control values 0b10 and 0b11 are not DC balanced, which results in a significant baseline "wander" during the time that VSYNC is transmitted. Note also that VSYNC is often used in negative parity, which means that the VSYNC value transmitted is "0" when VSYNC is asserted, and "1" when VSYNC is not asserted (depending on the video frame specific resolution details).

HDMI uses the unique high-transition content of these control symbols to distinguish them from other types of symbols used in HDMI. The high-transition content can be detected by the receiver, and the control symbols may be used by the receiver to perform symbol alignment when first acquiring the incoming signal stream (so-called symbol alignment synchronization).

Unfortunately, existing HDMI implementations may produce undesirable electromagnetic interference (EMI) with nearby wireless services (for example: Wi-Fi, PAN (e.g., Bluetooth), and/or cellular services). The resultant radio frequency interference can negatively impact, for example, an end user's Wi-Fi bandwidth, and reduce cellular bandwidth (or drop cellphone calls) when the appropriate wireless services are used simultaneously with HDMI. Such a problem is exacerbated in devices in which HDMI is used in close proximity with other wireless services, such as in a laptop computer, a tablet, or a smart phone.

Various solutions for handling the electromagnetic emissions have been proposed. For example, in incipient HDMI proposals, the use of scrambling for control symbols is mandatory for certain transmission speeds (e.g., above 340 million Tcharacter/sec/channel, where a Tcharacter comprises 10 bits of information that represent a byte of data or a control symbol according to the TMDS encoding specification). It is currently anticipated that scrambling may be required for all transmission rates. Those of ordinary skill in the related arts will readily appreciate that where a scrambler is used to transmit a data stream, a descrambler must be used within the receiver to descramble the received data stream. Consequently, in order to support both future and legacy products, the Assignee hereof ideally desires methods and apparatus configured to intelligently enable and/or disable scrambling capabilities.

Improved apparatus and methods are needed to configure scrambling and non-scrambling compatibilities, such as when designing for a broad spectrum of possible usage scenarios. More specifically, such apparatus and methods would, inter alia, provide for mechanisms that intelligently negotiate/determine scrambling and/or non-scrambling operation when connected to a peer device.

SUMMARY

The aforementioned needs are satisfied by providing, inter alia, improved apparatus and methods for intelligent selection and/or configuration of scrambling operation, such as for instance to accommodate both scrambling and non-scrambling connections (such as to e.g., legacy type devices).

In a first aspect, a method for intelligent configuration of a scrambling operation is disclosed. In one embodiment, the method includes: establishing a connection to a device; determining whether the device supports scrambling configuration; and when the device supports scrambling configuration, enabling a scrambler. In one variant, when the device does not support the scrambling configuration, the scrambler is disabled. In another embodiment, the method includes establishing a connection to a device; determining that the device supports a scrambling configuration; based at least on the determination that the device supports the scrambling configuration, enabling a scrambler.

In a second aspect, a computerized apparatus is disclosed. In one embodiment, the computerized apparatus includes a processor and logic configured to intelligently configure a scrambler. In another embodiment, the computerized apparatus includes a processor, an interface in data communication with the processor, and a non-transitory computer medium having at least one program stored thereon. The at least one computer program includes a plurality of instructions that are configured to, when executed, cause the computerized apparatus to: establish a connection to a device, determine if the device supports one or more scrambling functionalities, and configure the interface to transmit and/or receive data based at least in part on the determination.

In a third aspect, a computer readable apparatus is disclosed. In one embodiment, the apparatus includes a non-transitory storage medium having a plurality of instructions stored thereon, the plurality of instructions configured to, when executed, cause the sink device to: provide information indicative of one or more capabilities supported by the sink device, and select a scrambling profile of a plurality of scrambling profiles to use for data communication with a source device based at least on the information from the source device.

In a fourth aspect, a system is disclosed. In one embodiment, the system includes a first device and a second device in data communication with one another, such as via e.g., an HDMI-compliant interface. In another variant, at least one "source" and at least one "sink" are in communication with one another via the interface, and negotiate scrambler operation between them.

In a fifth aspect, a method of operating computerized apparatus so as to at least mitigate electromagnetic emissions is disclosed.

In a sixth aspect, scrambling logic is disclosed. In one embodiment, the logic comprises software-based logic configures to run on a processing apparatus. In another embodiment, the logic is hardware-based.

In another aspect of the present disclosure, a sink device is disclosed. In one embodiment, the sink device includes: an audio-visual interface in data communication with a source device, the audio-visual interface configured to receive a clock signal at either a first amplitude or a second amplitude that is lower than the first amplitude; a register accessible via the audio-visual interface; logic configured to recover the clock signal having the second amplitude when the source device enables a scrambling functionality of the one or more supported scrambling capabilities; and logic configured to recover the clock signal having the first amplitude when the one or more supported scrambling capabilities are not enabled.

In another aspect of the present disclosure, a computerized apparatus is disclosed. In one embodiment, the computerized apparatus includes: a non-transitory computer-readable apparatus including a storage medium, the storage medium having a computer program stored thereon, the computer program comprising a plurality of instructions that are configured to, when executed by the processor apparatus, cause the processor apparatus to: evaluate whether a scrambling functionality may be enabled on a source device; in response to a determination that the scrambling functionality may not be enabled, cause transmission of a clock signal over the network interface at an amplitude associated with legacy operation; and in response to a determination that the scrambling functionality may be enabled, negotiate a scrambling parameter with the source device, and cause transmission of the clock signal over the network interface at a reduced amplitude lower relative to the amplitude associated with the legacy operation.

Other features and advantages will immediately be recognized by persons of ordinary skill in the art with reference to the attached drawings and detailed description of exemplary embodiments as given below.

All Figures© Copyright 2012-2014 Apple Inc. All rights reserved.

DETAILED DESCRIPTION

Reference is now made to the drawings, wherein like numerals refer to like parts throughout.
Detailed Description of Exemplary Embodiments Exemplary embodiments are now described in detail. While these embodiments are primarily discussed in the context of an HDMI audio/visual (A/V) component network, it will be recognized by those of ordinary skill that the present disclosure is not in any way limited to HDMI applications or protocols. In fact, the various embodiments set forth herein are useful in any network that can benefit from the reduction of electromagnetic interference, such as for example in instances where transmitted symbols include predominant clock pattern content in order to improve DC-balance on the transmission medium.

As used herein, the term "HDMI" refers without limitation to apparatus and technology compliant with HDMI specifications, such as proposed "HDMI Specification"— Version 1.4b dated Oct. 11, 2011 (currently unpublished).

Furthermore, while the exemplary embodiments herein are disclosed in the context of a serial transmission of digital data represented as electrical levels, ones having ordinary skill in the related arts given the present disclosure will recognize that the various techniques may also extend to other systems and applications including, inter alia, multi-level wired systems (e.g., three-level encoded Ethernet), and modulated transmission schemes (e.g., a high frequency carrier that is modulated in the amplitude or frequency domain (AM or FM) by the signals being transmitted).
Exemplary HDMI System—

Figure 2:
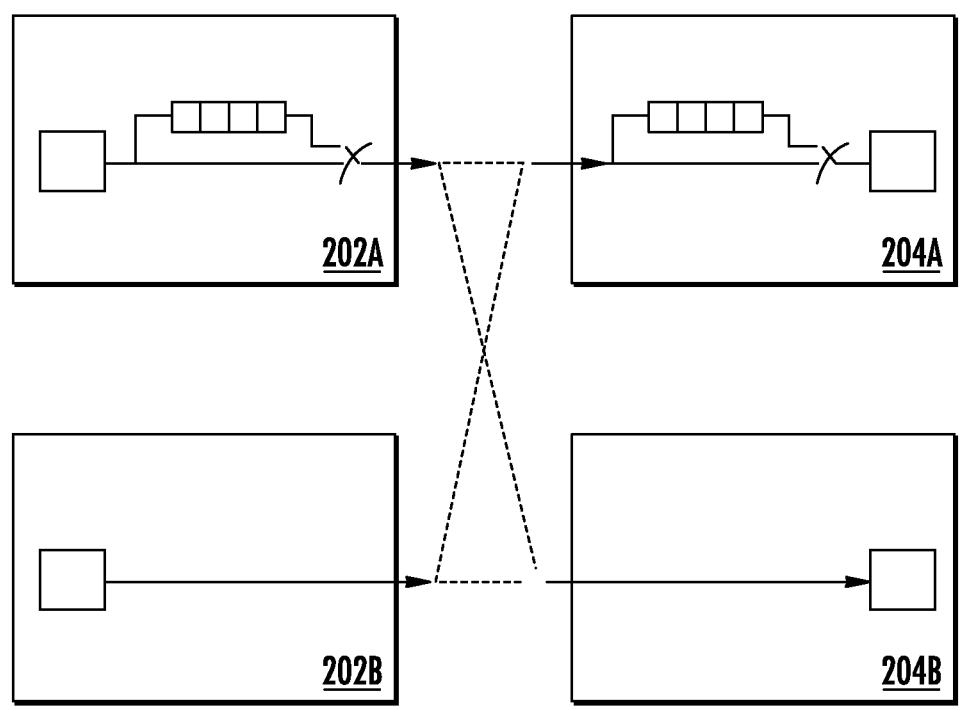
FIG. 2 is a logical block diagram of an exemplary HDMI network.

Referring now to FIG. 2, one exemplary HDMI network is illustrated. As shown, the HDMI network comprises one or more source devices 202, and one or more sink devices 204. It is appreciated that while the illustrated network describes the foregoing topology (i.e., one or more sources, and one or more sinks), the various aspects of the disclosure are in no way so limited.

Figure 1:
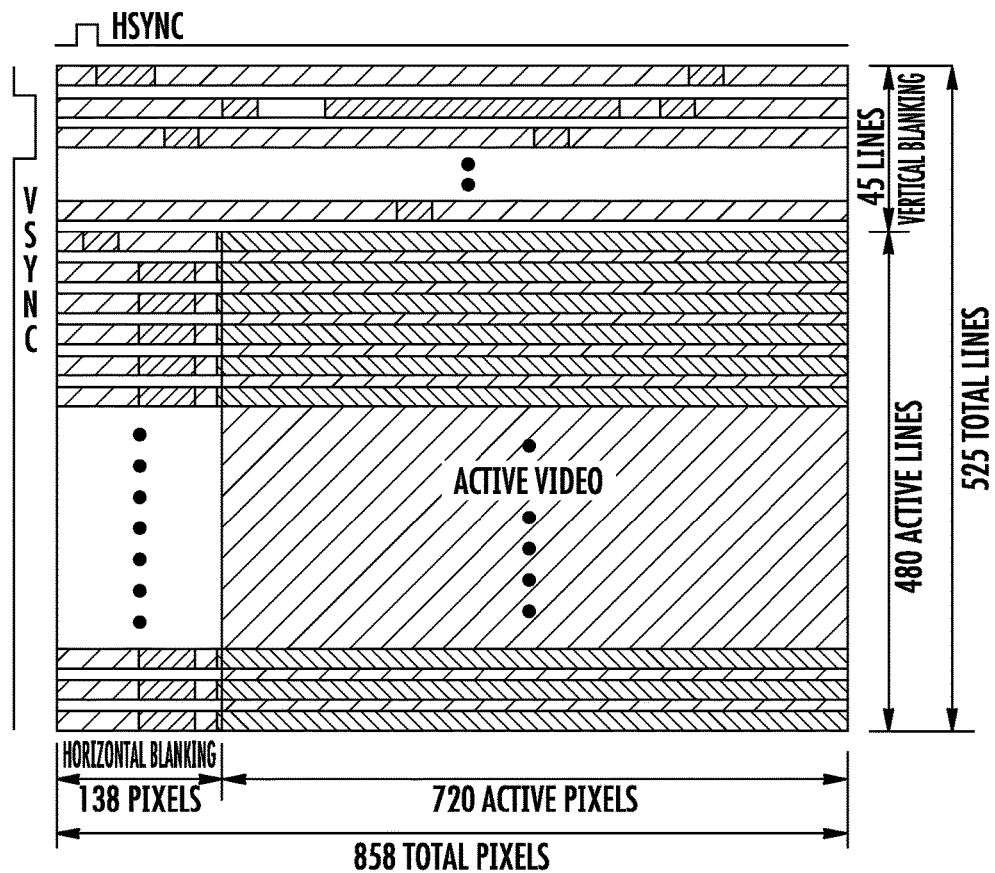
FIG. 1 is a graphical representation of an exemplary prior art HDMI 720x480p video frame.
Figure 1:
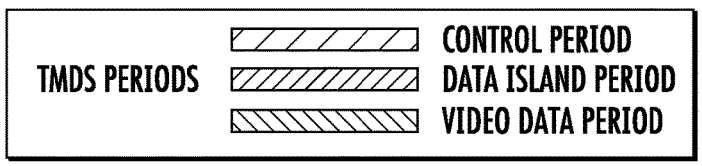

As previously described with FIG. 1, HDMI transmissions include: (1) a video data period in which the pixels of an active video line are transmitted; (2) a data island period in which audio and auxiliary data are transmitted; and (3) a control period which occurs between video and data island periods.

As shown, exemplary source 202A supports both scrambled and non-scrambled transmissions, whereas source 202B only supports non-scrambled transmissions. Similarly, sink 204A supports both scrambled and non-scrambled reception, whereas sink 204B only supports non-scrambled reception. During scrambled operation, source 202A and sink 204A enable respective complementary linear feedback shift registers (LFSR) which are XORed with the data stream. During unscrambled operation, source 202A and sink 204A disable the LFSR.

Under certain circumstances (such as above a transmit bit rate threshold), the source 202A and sink 204A may optionally enable scrambling to improve performance and reduce EMI emissions. Incipient draft HDMI standards have required that: (i) a source shall only use scrambling when it determines that the sink supports scrambling, and (ii) a sink that supports scrambling must be able to determine whether the incoming signal is being scrambled or not. More directly, when source 202A is connected to sink 204B, its LFSR must be disabled. Similarly, when source 202B is connected to sink 204A, the sink 204A must disable its receiving LFSR.

The Assignee hereof often prioritizes "user experience" over other considerations; thus to these ends, methods and apparatus are needed which intelligently configure scrambling operation to accommodate e.g., both scrambling and non-scrambling connections (such as to e.g., legacy type devices). Ideally, there should be no perceptible (to a human observer) delay as a result of the discovery process, so as to optimize the aforementioned user experience. Furthermore, there should be ideally little or no user-visible artifacts (e.g., blank or flashing screen) when enabling/disabling scrambling.

Additionally, various use cases may have more or less commercial importance for the Assignee hereof. For example, while dynamic enabling/disabling of scrambling may be supported within the larger HDMI population, various embodiments described herein may be configured if desired to limit enabling/disabling of scrambling to certain situations e.g., when there is a change of display resolution, etc.
Methods—

Figure 3:
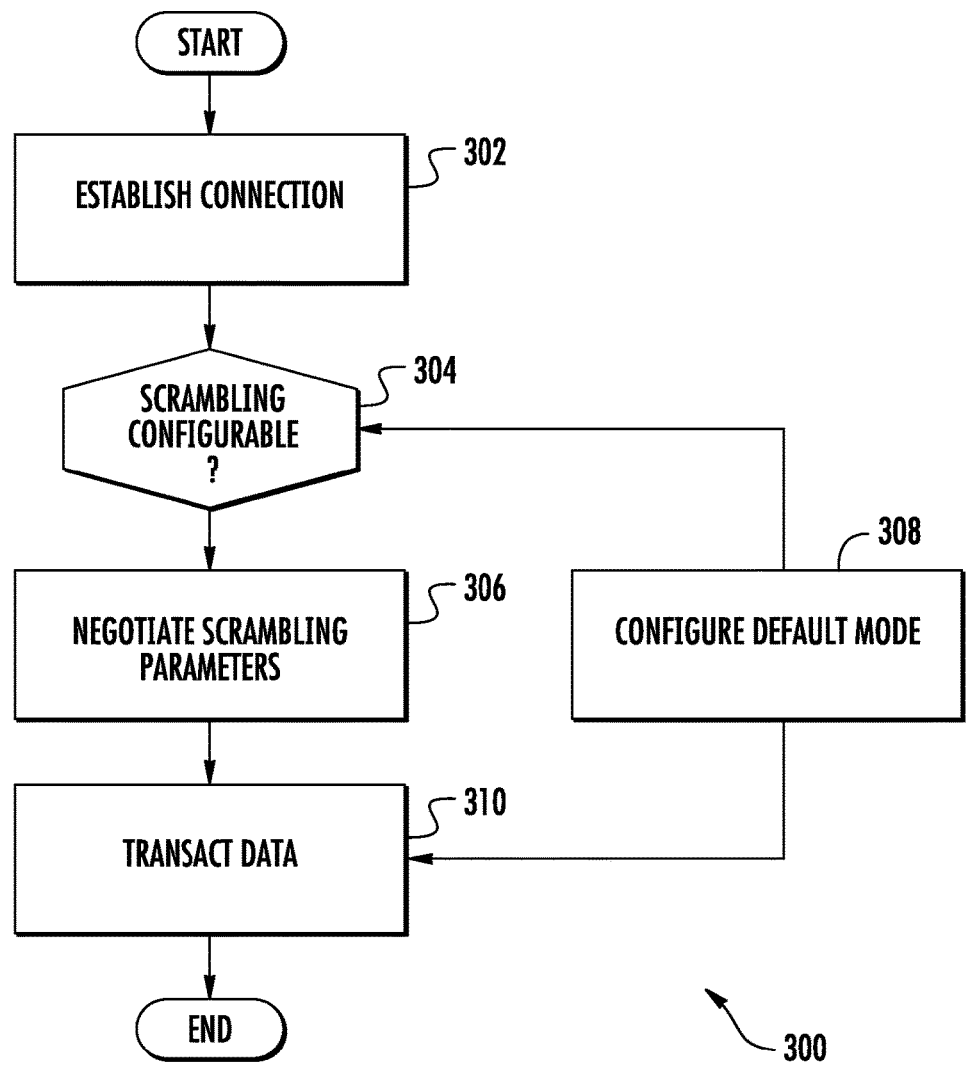
FIG. 3 is a logical flow diagram illustrating one embodiment of the process steps for determining an appropriate mode of operation, in accordance with the principles described herein.

FIG. 3 illustrates one exemplary embodiment of a method 300 for determining an appropriate mode of operation according to the disclosure.

At step 302 of the method 300, a source device and a sink device establish a connection. In one embodiment the connection is a control and data connection, and can be established under any number of different scenarios, such as for instance being manually configured/initiated by a user, automatically (e.g., by software) and/or semi-automatically (e.g., upon making of a physical connection between the two devices). In one exemplary embodiment, the connection is an HDMI connection which includes: (1) video data, (2) other data (e.g., audio, text, etc.), (3) control, (4) null data (blanking intervals, guard data, etc.). Various other protocols and technologies may similarly benefit from the principles described herein; other common examples of bus technologies include for example (and without limitation): DisplayPort™, Thunderbolt™, USB, Firewire™, etc.

The connection may be wired or wireless, and may incorporate one or more logical virtual connections.

While the foregoing topology is described in terms of a unidirectional connection between a source device (transmitter) and a sink device (receiver), it is appreciated that other topologies may be used, including e.g., unicast, multicast, broadcast, bidirectional, unidirectional, etc. Additionally, the following discussions are described within the context of a direct connection; however it is further appreciated that in some instances, various principles described herein may have application to both circuit-switched and/or packet-switched networks and/or other technologies that incorporate one or more intermediary entities (e.g., network or relay nodes between the source and the sink).

At step 304 of the method 300, the source device and/or sink device determine if scrambling can be enabled/disabled. In one embodiment, determination can be made explicitly via a messaging transaction. To ensure backward compatibility, the messaging transaction may further take the form of a two-part query that requests the device version/revision, and for versions/revisions which are appropriately enabled, a subsequent query for capabilities may be made. In other common embodiments, the messaging transaction may take the form of a non-fatal query (i.e., where legacy devices are configured to ignore unexpected/unknown transactions).

In yet other embodiments, the source and/or sink read a register and/or configuration file to determine the peer entity's capabilities. For example, devices which can be configured to enable/disable scrambling may have a dedicated addressable memory space for storing various capabilities flags. In some cases, this dedicated addressable memory space is a hard-coded read only memory (ROM); alternately, the memory space is implemented within registers or device memory.

In still other embodiments, the source and sink receive capabilities information according to an out-of-band process. Common examples of out-of-band processes include e.g., manual input (e.g., a user enables scrambling in both the source and sink), an external registry device (e.g., a networked management entity, etc.), via higher layers of software (such as for instance the application software which controls both the source and the sink, etc.)

In alternate implementations, the devices may implicitly determine scrambling capabilities based on ongoing communications. For example, certain technologies may provide known symbols at regular intervals or associated with prescribed events. Based on the expected symbol, the sink may implicitly determine if the source is scrambling the symbols, or alternately if the symbols are being transmitted in their "unscrambled" form.

In another such example, it is appreciated that scrambling imparts certain desirable qualities to the data stream e.g., reduced emissions, desirable running disparities, limited clock content, etc. An appropriately enabled sink can detect the presence or absence of one or more of these qualities to determine if the source is scrambling the data stream.

Other forms of implicit determination may be based on certain "agreed" use cases, etc. For example, the source and sink may have implicit agreements to enable/disable scrambling under certain use cases. Common examples include, without limitation: exceeding or falling below certain prescribed data rates, the presence of neighboring devices, the presence of neighboring interferers, type of application, etc.

If scrambling can be enabled/disabled, the source device and the sink device negotiate one or more scrambling parameters (step 306) for a connection, otherwise, the source and sink device operate in a default mode (step 308) for the connection.

Examples of scrambling parameters may include e.g., type of scrambler (for example, when multiple different scrambling LFSRs, algorithms, etc. are supported), exceptions (e.g., data or control symbols which are not to be scrambled, etc.), duration of scrambling, etc. For example, a source and sink may have multiple different scrambling capabilities to support a wide range of devices. During operation, the source and the sink must agree (either explicitly or implicitly) on the type of scrambler used, etc. In some use scenarios, the source and sink may need to explicitly negotiate or agree on certain circumstances where scrambling may or may not be enabled. For instance, in some cases the source and sink may need to dynamically determine when to scramble data, control, and null data. In other examples, the scrambling may only be implemented over a subset of the periods (e.g., data-only, etc.).

Still other options may include scrambler operation after e.g., low power modes, display resolution changes, mode changes, etc. For example, in some cases, the scrambler should be reset after each resolution change. In other examples, the scrambler is not reset during low power modes.

As step 310 of the method 300, data is transacted over the connection.

Example Operation

Referring now to one illustrative example, various principles as described herein are applied to one exemplary HDMI network.

The exemplary sink device indicates that it supports optional scrambling operation with e.g., a flag that is set in the sink's extended display identification data (EDID).

As a brief aside, the EDID is a data structure that describes the sink device's capabilities to a source device (e.g. graphics card or set-top box). The composition of the EDID data structure is defined by the Video Electronics Standards Association (VESA). For example, the EDID may include information such as e.g., manufacturer name and serial number, product type, phosphor or filter type, timings supported by the display, display size, luminance data, and pixel mapping data.

Traditionally, the EDID is transmitted from the sink device to the source device during connection initiation. In other configurations, the EDID may be read from the sink device. Typical implementations store the EDID in a non-volatile memory (e.g., programmable read-only memory (PROM), electrically erasable (EEPROM), FLASH, etc.) which can often be read even if the sink device does not have power.

The EDID data structure is commonly used with a companion display data channel (DDC) access protocol. The DDC protocol is used when the source and sink negotiate one or more display parameters, etc. In one exemplary embodiment, the DDC protocol is performed over an I2C (Inter-Integrated Circuit) bus.

In either implementation, the flag may be addressable at a particular register (or memory space) address. During initialization (or operation) the source device can read the flag, or alternately the sink device can advertise the capability. The additional time required to read the flag (over the duration to read e.g., existing EDID memory space) is negligible, and has no perceptible impact. In some optimized variants, the register space may be organized so that all appropriate capabilities can be read by the source device in a single read transaction.

During normal operation, if a source device supports scrambling, then it reads the sink capabilities from the appropriate address space. If the sink device supports scrambling, then the source device determines if scrambling should be enabled.

In some embodiments, the source may automatically enable scrambling where the sink is similarly enabled. In other embodiments, the source device may consider other factors in its determination of whether to enable scrambling, including without limitation: effects on power consumption, computational complexity, data requirements, neighboring device requirements, etc. For example, different types of scrambling mechanisms have different degrees of EMI emission, processing, control overhead, power consumption, etc. So-called "self-synchronizing" scramblers may reduce control overhead, but may require more computational complexity (and corresponding power) than other types of scramblers in the source and/or sink. In other examples, for slow enough and/or intermittent transactions, scrambling may not be required at all (e.g., EMI emissions are relatively low) and may be disabled to save on power consumption.

Certain embodiments may further enable and/or disable other features in view of the scrambling/descrambling state. For example, scrambling may assist in certain types of clock recovery (e.g., because EMI emissions which "bleed" into clock recovery circuits are reduced, etc.). Therefore, when scrambling is enabled the receiver can recover the clock from much lower power signaling, and the source may transmit the clock at reduced signal amplitudes. Other common features which may be enabled/disabled include e.g., error recovery, forward error correction, reduced power consumption modes (e.g., sleep, idle, etc.). In alternate embodiments, these features may be separately enabled and/or disabled.

Moreover, while the foregoing example is described in terms of initial configuration (e.g., when the source and sink are first connected), it is appreciated that other events may trigger re-evaluation, or may delay such evaluation. For example, re-evaluation may occur when there is a change in operating mode (e.g., display size), a change in power consumption, a change in neighboring device operation, a change in software application, etc. In still other cases, a user or other external entity may choose to enable/disable scrambling operation. For example, the presence neighboring device activity (e.g., a phone call) may trigger the source to re-evaluate and possibly transition to scrambling operation (as well as transition from scrambling operation when the call is completed).

In some embodiments, when the source determines that scrambling is necessary, the source writes to a status flag in the HDMI DDC register space (or I2C space). When the sink reads the DDC register space, the sink can determine if scrambling is enabled. The register write/read mechanism may be suitable for implementations where the source enables/disables scrambling at known times (e.g., before commencing video transmission or on a mode-set). However, if the source enables/disables scrambling at arbitrary times, the sideband channel and the main link signaling may fall out of synchronization (resulting in undesirable visual artifacts, or complete link failure).

In one exemplary embodiment, the scrambler may be enabled and disabled according to a periodic (or otherwise well defined) scheme. For example, in one such implementation, the original so-called TMDS "unscrambled" control characters are transmitted to assist in character synchronization (i.e., to identify where the 10-bit character boundaries occur in the bit stream). However, due to the adverse EMI emissions associated with the unscrambled control characters, the proposed HDMI requirements limit such transmissions to a few unscrambled control characters (in sequence), so as to minimize the EMI/RFI impact. In one such instance, the transmitter transmits a small number of these at periodic intervals (e.g. once every video frame). The receiver determines that scrambling is not being used if it receives a sequence that exceeds the expected number. In other examples, since "scrambled" control symbols are distinct and are never transmitted when scrambling is not being used, detecting one (or a few) scrambled control symbols allows the receiver to determine that scrambling is enabled.

In other embodiments, the sink device may be configured to actively detect scrambling based on e.g., known control symbols. For instance, TMDS control symbols have specific bit patterns (see e.g., Description of Related Technology, discussed supra) when scrambling is not used, which can be clearly distinguished from other bus traffic. These control characters are also never produced when the scrambler is enabled (i.e., no input to the scrambling logic will result in the identical waveform). Consequently, a sink device can detect that the source is (or is not) scrambling its transmissions by detecting the absence (or presence) of the legacy control characters. Certain "robust" variations may additionally require the detection of a sequence of such control characters (e.g., four control symbols); in some very rare circumstances, even when scrambling is not being used, a number of bit errors may create a false detection.

In the context of these limitations, a sink device can detect scrambling/non-scrambling operation by searching for a string of non-scrambled control characters which do not comply with the defined requirements. For example, if the sink detects more than the prescribed number of non-scrambled control characters with no intervening scrambled control characters, then the sink can infer that scrambling is disabled. For robust designs, the count may be further padded with a margin of error (e.g., the detection of a few extra unscrambled control characters (over the expected number) with no intervening scrambled control characters).

Explicit Scrambler Synchronization—

Various implementations may further implement some scheme for synchronizing the LFSR in the source with the complementary LFSR in the sink. In some embodiments, synchronization is performed by forcing the LFSRs to reset to an initial value. In one such implementation, the source resets its own LFSR, and transmits an explicit scrambler reset (SR) sequence to the sink; responsively, the sink resets its LFSR.

It is further appreciated that for certain embodiments, the initialization of the scrambling/descrambling LFSR can be performed regardless of whether scrambling is actually used. In one embodiment, the source and sink can synchronize their respective LFSRs, and shift through LFSR states as successive characters are received, while acquiring character lock. If scrambling is being used, then the LFSRs are already synchronized and can be immediately used. Otherwise, if scrambling is not being used, then the LFSRs can be disregarded. Even if the scrambling is not enabled, the LFSRs may be kept active so that scrambling can be quickly enabled in the future. Conversely, if scrambling is not enabled the LFSRs may be halted to, inter alia, reduce power consumption.

During the character lock process, the sink may not be able to count all ten characters, as the sink may not have character synchronization until near the end of the sequence. Since the sink cannot rely on an accurate count to determine when to enable scrambling, in one exemplary implementation the sink resets the LFSR when it detects a character other than a non-scrambled control character. More directly, the sink device will assume that any received characters (received after the non-scrambled control characters) are scrambled. It is further appreciated that the next scrambled character may still be a control character. For example, when the source enables scrambling during a control character sequence, the next character will be a scrambled control character. Under these situations, the exemplary sink can take the required action e.g., reset the LFSR and immediately descramble the subsequent received scrambled control characters.

In alternate synchronization schemes, the LFSR in the source and sink device may have "self-synchronization" properties. Self-synchronizing LFSRs have a property where the receiving LFSR can match its state to the transmitting LFSR by forcing its inputs to the received data for a designated period. Self-synchronizing LFSRs do not require an explicit reset sequence. Self-synchronization schemes have limited utility in the context of extant HDMI scrambling proposals (although future implementations may incorporate self-scrambling capabilities), and thus the discussion of self-synchronizing LFSRs is provided in a subsequent section hereinafter.

Self-Synchronizing Scramblers—

While explicit scrambler synchronization can be used when scrambling occurs at known times e.g., (before start of video transmission, on a mode-set, etc.), however, explicit scrambler synchronization may not be appropriate for usage scenarios where scrambling is enabled/disabled at arbitrary times. Consequently, an alternative mechanism to support arbitrary scrambler synchronization is a self synchronizing scrambler. Self-synchronizing scramblers use the values being transmitted to synchronize the receiver's LFSR. This technique is used in related standards such as the IEEE 1394b-2002 specification, which is incorporated by reference herein in its entirety.

A self-synchronizing scrambler pair exhibits the property where the transmitting LFSR can transmit a particular sequence of symbols; where the particular sequence when received by the receiving LFSR, will result in the transmit and receive LFSRs being synchronized. In one exemplary HDMI self-synchronizing LFSR, a known value is included in the pre-scrambled control character value. This known value is used to generate a 5-bit pre-scrambled value that selects from an alphabet of 32 scrambled control characters.

The sink initializes its LFSR to an initial state and uses the known value to "descramble" the incoming data. This does not require an explicit scrambling reset symbol, nor does the receiver need to explicitly detect whether scrambling is being used or not. Only sixteen (16) of the resulting scrambled control characters will synchronize the receiver's LFSR. Typically, there are many more than sixteen (16) symbols transmitted during each horizontal blanking interval, and so synchronization occurs almost immediately (without perceptible artifacts to the user).

To disable scrambling, the source picks a point in time when it is about to transmit at least 16 control characters, and resets its LFSR to all zeros. The subsequently transmitted control characters use this LFSR value (the LFSR stays zero) and then continues as usual. The transmitted data is scrambled with the reset LFSR (in effect not scrambled), and is "descrambled" in the receiver with a receiving LFSR of zero (in effect not descrambled).

Apparatus—

Figure 4:
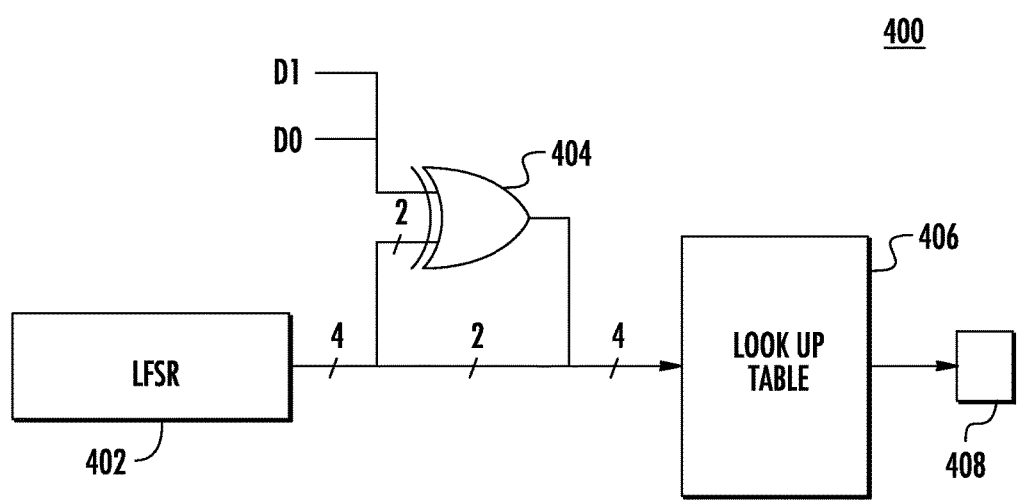
FIG. 4 is a functional block diagram illustrating one embodiment of a circuit adapted to implement the scrambling of control symbols, in accordance with the disclosure.

Referring now to FIG. 4, an exemplary embodiment of a circuit 400 adapted for the transmission of scrambled control symbols is illustrated. The circuit illustrated in FIG. 4 is shown implemented in hardware, although it is appreciated that the logic illustrated in FIG. 4 could readily be implemented in software, or combinations of hardware and software, as well.

The exemplary circuit 400 includes an LFSR 402 which is selected for this embodiment because the operation of the LFSR is advantageously deterministic, while also providing a sequence of bits that appears random. Accordingly, and as discussed previously herein, synchronization between transmitter and receiver can be maintained if the cycles between the LFSR at the transmitter and the LFSR at the receiver remains synchronized, and both LFSR's are loaded with the same seed value. In an exemplary embodiment, the LFSR is a 16-bit LFSR, although it is appreciated that other LFSR configurations could readily be substituted, such as for example, those described previously herein. When using an exemplary 16-bit LFSR, a subset of bits (e.g. the four (4) least significant bits) is used for control symbol encoding.

Of this subset of bits, an additional subset (e.g. the two (2) least significant bits of the subset) is fed into an XOR logic gate 404 along with control signals D1 and D0. The output of the XOR logic gate is then combined with the remaining bits from the additional subset (e.g. the two (2) most significant bits of the subset) to produce a 4-bit random value. This random value is then fed into a data structure (e.g., a lookup table 406). The lookup table then chooses a scrambled control symbol value and forwards this scrambled control symbol value to transmitter 408. The scrambled control symbols are in the exemplary embodiment preselected so that they contain desirable numeric properties such that their transmission over a transmission medium minimizes undesirable electromagnetic radiation and resultant EMI. The number of preselected scrambled control symbols can be chosen from any sufficiently large set of scrambled control symbols such that their transmission characteristics are desirable when placed in proximity to other transmission mediums, whether wired or wireless.

Figure 5:
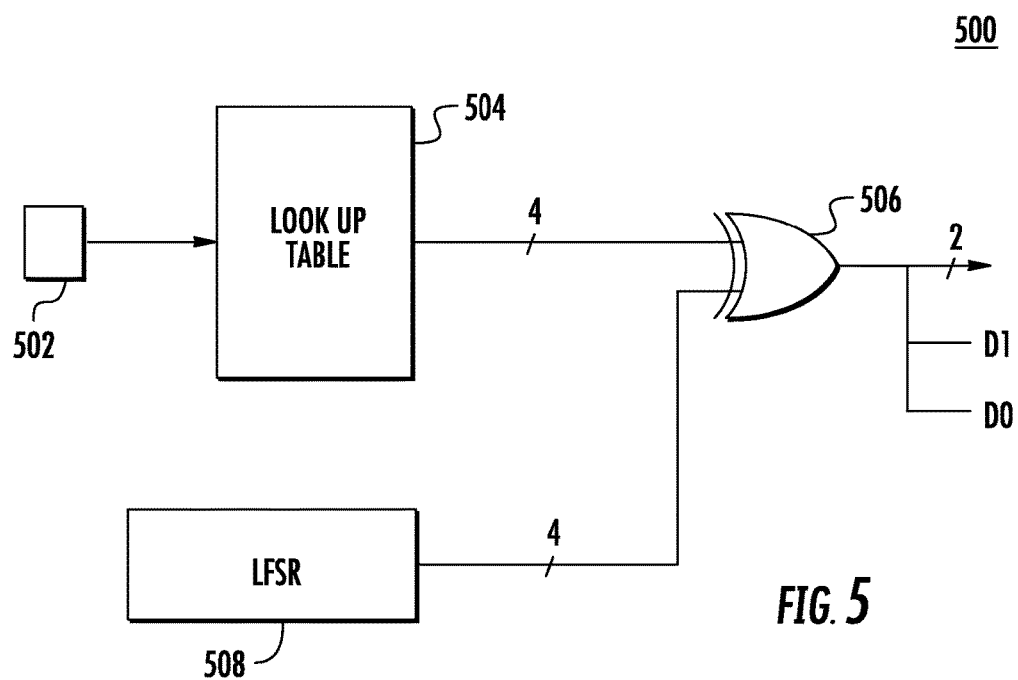
FIG. 5 is a functional block diagram illustrating one embodiment of a circuit adapted to implement the unscrambling of scrambled control symbols in accordance with the disclosure.

Referring now to FIG. 5, an exemplary embodiment of a circuit 500 adapted to implement the reception of scrambled control symbols is illustrated. The circuit illustrated in FIG. 5 is shown implemented in hardware, although it is again appreciated that the logic illustrated could readily be implemented in software as well, or combinations thereof. The V circuit 500 includes a receiver 502 that receives the incoming scrambled control symbols from the transmitter. These incoming scrambled control symbols are then fed into a lookup table 504. The lookup table 504 is essentially a reverse of the lookup table 406 shown in FIG. 4; the lookup table in FIG. 5 takes the scrambled control symbol and outputs an apparent random value (e.g., the 4-bit value that served as the input to the lookup table in FIG. 4).

The circuit also includes an LFSR 508 which is synchronized with the LFSR 402 illustrated in FIG. 4 so that its output is identical. Similar to that shown in FIG. 4, in an exemplary embodiment, the LFSR is a 16-bit LFSR, in which a subset of bits (e.g. the four (4) least significant bits) is used for control symbol decoding. This subset of bits is then fed into an XOR logic gate 506, and is XOR'd with the bit value determined by the lookup table 504. The output of this XOR operation is a 4-bit value with the least significant two bits being indicative of the original control signals D1 and D0.

Figure 6:
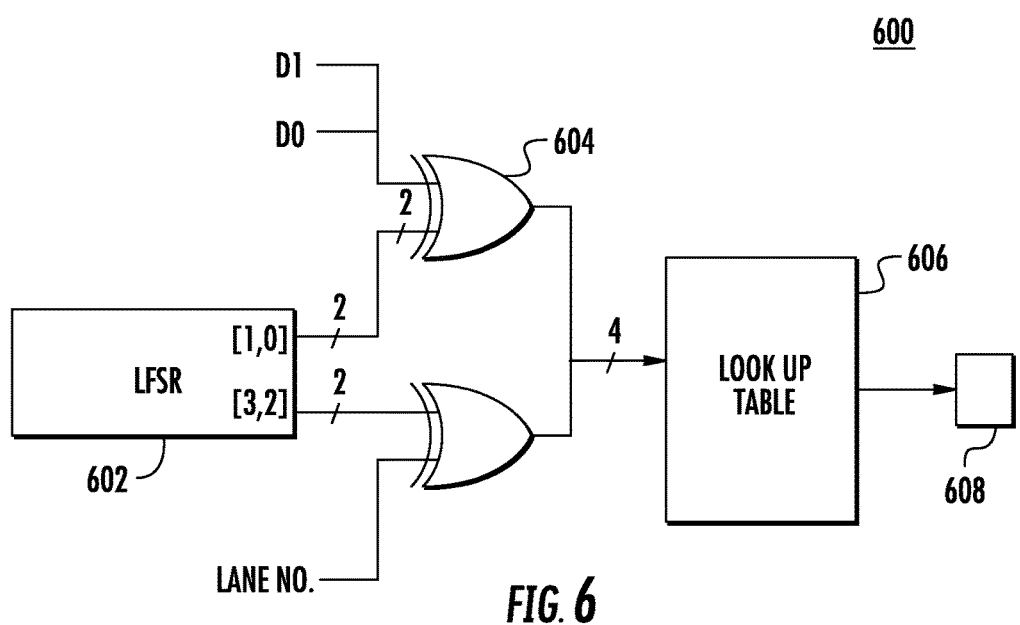
FIG. 6 is a functional block diagram illustrating an embodiment of a circuit adapted to implement the scrambling of control symbols in accordance with the disclosure.

Referring now to FIG. 6, an exemplary embodiment of a circuit 600 adapted for the transmission of scrambled control symbols is illustrated. The circuit illustrated in FIG. 4 is shown implemented in hardware, although it is appreciated that the logic illustrated in FIG. 6 could readily be implemented in software, or combinations of hardware and software, as well. The circuit 600 includes an LFSR 602 which is advantageously used because the operation of the LFSR is deterministic, while also providing a sequence of bits that appears random. In an exemplary implementation, the LFSR is a 16-bit LFSR that is "self-synchronizing" as described previously herein. When using an exemplary 16-bit LFSR, a subset of bits (e.g. the four (4) least significant bits) is used for control symbol encoding.

Of this subset of bits, an additional subset (e.g. the two (2) least significant bits of the subset) is fed into an XOR logic gate 604 along with control signals D1 and D0. The output of the XOR logic gate is then combined with the XOR'd output of the two most significant bits of this subset and the lane number to produce a 4-bit random value. This random value is then fed into a lookup table 606. The lookup table then chooses a scrambled control symbol value and forwards this scrambled control symbol value to transmitter 608.

Figure 7:
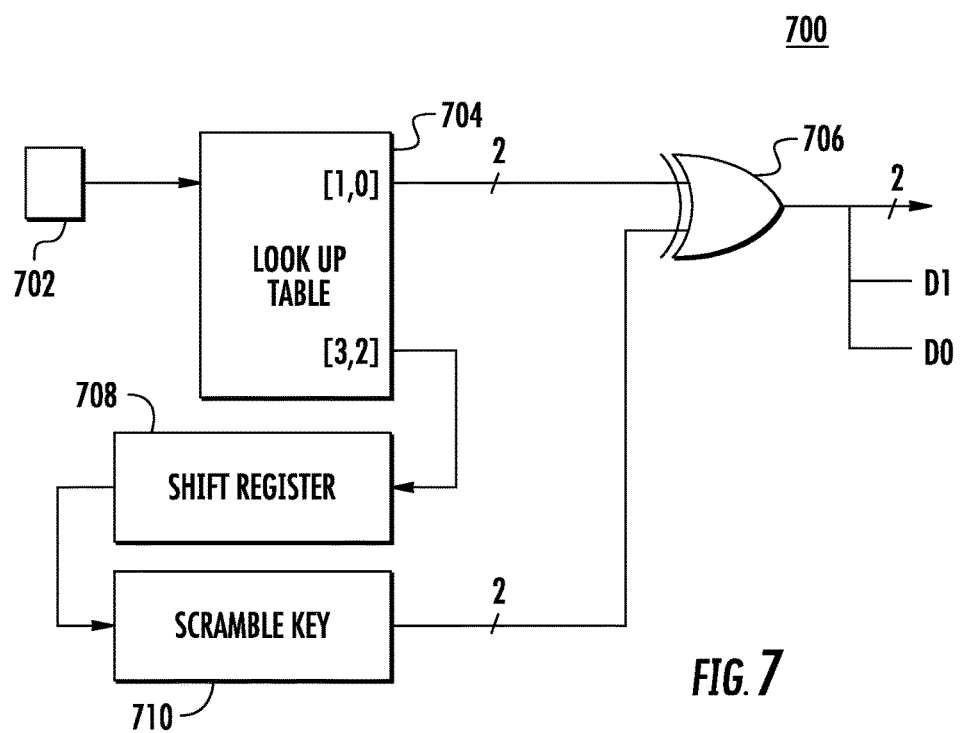
FIG. 7 is a functional block diagram illustrating an embodiment of a circuit adapted to implement the unscrambling of scrambled control symbols in accordance with the disclosure.

Referring now to FIG. 7, an exemplary embodiment of a circuit 700 adapted to implement the reception of scrambled control symbols, such as those transmitted in the transmitter of FIG. 6 is illustrated. The circuit illustrated in FIG. 7 is shown implemented in hardware, although it is again appreciated that the logic illustrated could readily be implemented in software as well, or combinations thereof. The circuit 700 includes a receiver 702 that receives the incoming scrambled control symbols from the transmitter. These incoming scrambled control symbols are then fed into a lookup table 704. The lookup table 704 is essentially a reverse of the lookup table 606 shown in FIG. 6; the lookup table in FIG. 7 takes the scrambled control symbol and outputs an apparent random value (e.g., the 4-bit value that served as the input to the lookup table in FIG. 6).

The least significant two bits of this 4-bit value are then fed into an XOR logic gate 706, along with the value of scramble key 710 in order to output the control values "D1" and "D0". In order to generate the value of scramble key 710, the most significant two bits of this 4-bit value are fed into a shift register 708. As discussed previously herein, due to the nature of the LFSR chosen in the transmitter, i.e. the generating function for the LFSR does not contain the terms X3, X2 or X1, the shift register can be used in order to generate the appropriate scramble key value for the next scrambled control symbol received at the receiver 702. In this manner, by using a self-synchronizing LFSR in the transmitter, the receiver can be implemented without having to contain its own respective LFSR, thereby greatly simplifying the receiver logic.

Figure 8:
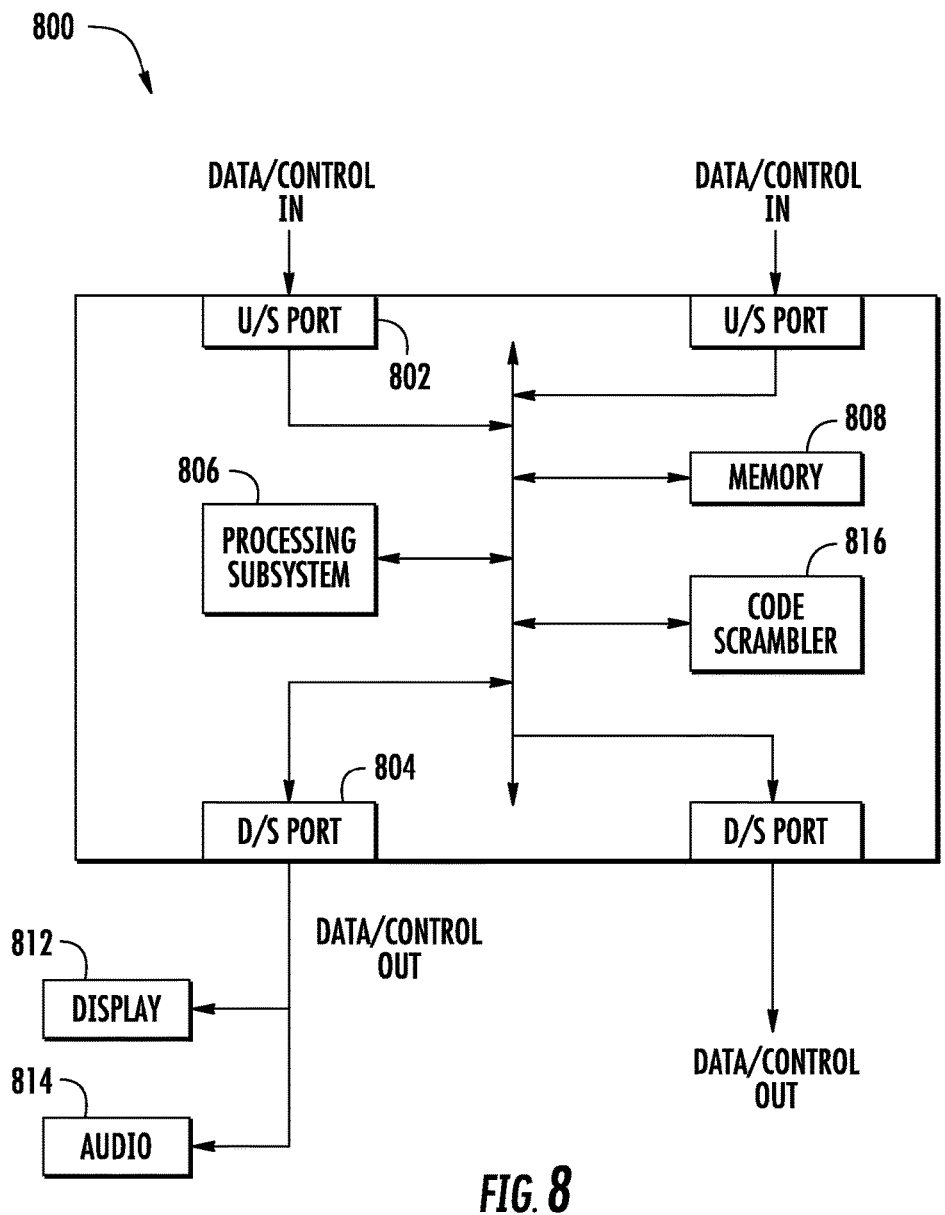
FIG. 8 is a functional block diagram illustrating one embodiment of a network component apparatus adapted to implement the methods of the present disclosure.

Referring now to FIG. 8, an exemplary user device (apparatus) 800 having control symbol encoding/decoding capability is illustrated. As used herein, the term "user device" includes but is not limited to cellular telephones, smartphones (such as for example an iPhone™ manufactured by the Assignee hereof), tablets (such as for example an iPad™), phablets, personal computers (PCs), such as for example an iMac™, Mac Pro™, Mac Mini™, MacBook™, MacBook Pro™, MacBook Air™, and minicomputers, whether desktop, laptop, or otherwise, as well as mobile devices such as handheld computers, PDAs, video cameras, set-top boxes, personal media devices (PMDs) (such as for example an iPod™), display devices (e.g., those compliant with the aforementioned HDMI standard(s)), or any combinations or variants of the foregoing. While a specific device configuration and layout is shown and discussed, it is recognized that many other configurations may be readily implemented by one of ordinary skill given the present disclosure, the apparatus 800 of FIG. 8 being merely illustrative of the broader principles of the disclosure. For example, it is appreciated that the device illustrated in FIG. 8 could readily be implemented as either a source or alternatively as a sink, or in fact could be configured to operate as both. Appropriate modifications to the layout shown would be readily apparent to one of ordinary skill given the present disclosure.

The illustrated apparatus 800 of FIG. 8 includes an upstream plurality of ports and corresponding receiving elements (e.g., receiver or transceiver network interfaces) 802, a downstream plurality of ports and corresponding transmitting elements (transmitting interfaces or transceivers) 804. As used herein, the terms "network interface" or "interface" typically refer to any signal, data, or software interface with a component, network or process including for example and without limitation those of the HDMI, FireWire (e.g., FW400, FW800, etc.), USB (e.g., USB2, USB 2.0, USB 3.0, wireless USB), Ethernet (e.g., 10/100, 10/100/1000 (Gigabit Ethernet), 10-Gig-E, etc.), Thunderbolt, or wireless varieties.

The upstream plurality of ports and associated receiving elements 802 may comprise one or more upstream auxiliary channels, one or more upstream media ports, and receiver apparatus (e.g., multiplexing switches, reception logic, clock recovery circuitry, etc.). In one exemplary embodiment, the auxiliary channel is bi-directional and carries management and device control data, and the upstream media ports minimally comprise receivers for unidirectional data lanes, and use of an embedded clock. The receiver apparatus monitors and selectively enables and disables the auxiliary and media ports. In certain embodiments, the receiver apparatus may be adapted to utilize a packet-based unidirectional network protocol, such as the exemplary HDMI protocol previously described herein.

Similarly, the downstream plurality of ports and associated receiving elements 804 comprise one or more downstream auxiliary channels, one or more downstream media ports, and transmitter apparatus (e.g. demultiplexing switches, transmission logic, clock embedding circuitry, etc.). In one exemplary embodiment, the auxiliary channel is bi-directional and carries management and device control data, and the downstream media ports minimally comprise transmitters for unidirectional data lanes, and inclusion of an embedded clock. The transmitter apparatus monitors and selectively enables and disables the auxiliary and media ports. As with the receiver, the transmitter apparatus may be adapted to utilize a packet-based unidirectional network protocol (e.g., HDMI).

In an exemplary implementation, the downstream-facing ports may include a serializer adapted to receive an input word and output a bit stream. For example, in one configuration, the serializer may receive a 10-bit input word and output ten (10) serial bits. In addition, the serializer may also provide an optional corresponding clock.

Conversely, in another configuration, the upstream-facing ports may also include a de-serializer adapted to receive a serial bit stream and output a word. Furthermore, such de-serializing apparatus may additionally require clock recovery circuitry and boundary detection, as is well understood in the digital computing arts. For example, in one embodiment, the de-serializer may receive 10 (ten) serial bits, and convert it into one 10-bit word. When the de-serializer detects a misalignment of timing by one or more bits, the de-serializer accordingly skips or pads its rate accordingly. Furthermore, during initialization, the de-serializer may recognize an initiation sequence.

Also included are one or more storage devices (e.g., a memory subsystem) 810 used to store for example data for transmission or that has been received.

It will be appreciated that not all elements are required in a single device for operation within a "network", for instance a device only capable of "source" operation would not require upstream ports, or certain audio or video elements. Conversely, a "sink" device may not require downstream ports. Moreover, the "receiver" 802 and "transmitter" 804 elements may comprise transceivers capable of both transmission and reception if desired.

Note that as used herein, such network may be comprised of as few as two devices in communication with one another via an interface, or even two components in communication with one another within the same host apparatus.

The processing subsystem 806 may comprise one or more of central processing units (CPU) or digital processors, such as a microprocessor, digital signal processor, field-programmable gate array, RISC core, or plurality of processing components mounted on one or more substrates.

The processing subsystem is coupled to memory subsystem 810, which may include for example SRAM, FLASH and SDRAM components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

The processing subsystem may also comprise additional co-processors, such as a dedicated graphics accelerator, network processor (NP), or audio/video processor. As shown processing subsystem 806 includes discrete components, however it is understood that in some embodiments they may be consolidated or fashioned in a SoC (system-on-chip) or other ASIC (application specific integrated circuit) configuration.

The processing subsystem 806 is adapted to receive one or more media streams from an upstream apparatus 802 for processing for media displays such as a video display 812, or audio speakers 814. Processing subsystem 806 may preferentially comprise graphics processors, applications processors, and or audio processors. In "thin clients", the processing subsystem 806 may be significantly reduced in complexity and limited to simple logic, or in extreme cases altogether non-existent.

The control code scrambling circuitry 816 is, in an exemplary embodiment, tightly coupled (i.e., directly accessible) for execution on the processing subsystem. This circuitry could be embodied in hardware, software or a combination of both. As used herein, the term "circuitry" refers to any type of device having any level of integration (including without limitation ULSI, VLSI, and LSI) and irrespective of process or base materials (including, without limitation Si, SiGe, CMOS and GaAs). ICs may include, for example, memory devices, digital processors, SoC devices, FPGAs, ASICs, ADCs, DACs, transceivers, memory controllers, and other devices, as well as any combinations thereof. It is however recognized that the control code scrambling circuitry could alternatively be decoupled and executed independent of the processing element in alternate embodiments.

In an exemplary embodiment, the control code encoding circuitry 816 of the apparatus of FIG. 8 is implemented at least in part as a computer program; e.g., module of executable application software embodied within a tangible medium such as a physical block of memory (for example, the memory subsystem 808 of FIG. 8). As used herein, the term "computer program" or "software" is meant to include any sequence or human or machine cognizable steps which perform a function. Such program may be rendered in virtually any programming language or environment including, for example and without limitation, C/C++, Fortran, COBOL, PASCAL, assembly language, and the like, as well as object-oriented environments such as Java™ (including J2ME, Java Beans, etc.).

In one exemplary embodiment, the computer-readable medium includes instructions which are configured to, when executed by a processor, establish a connection to a peer device. In one embodiment the connection is a control and data connection, and can be established under any number of different scenarios, such as for instance being manually configured/initiated by a user, automatically (e.g., by software) and/or semi-automatically (e.g., upon making of a physical connection between the two devices). In one exemplary embodiment, the connection is an HDMI connection which includes: (1) video data, (2) other data (e.g., audio, text, etc.), (3) control, (4) null data (blanking intervals, guard data, etc.). Various embodiments of the apparatus 800 may establish e.g., unidirectional connections, bidirectional, broadcast, multicast, etc.

Once connected, the processor can determine if scrambling can be enabled/disabled. Determinations can be made implicitly (e.g., according to pre-agreed usage cases) or explicitly (e.g., via a messaging transaction). Other common examples include e.g., reading a register and/or configuration file to determine the peer entity's capabilities. For example, devices which are can be configured to enable/disable scrambling may have a dedicated addressable memory space for storing various capabilities flags.

In still other embodiments, the capabilities information can be received according to an out-of-band process. Common examples of out-of-band processes include e.g., manual input (e.g., a user enables scrambling in both the source and sink), an external registry device (e.g., a networked management entity, etc.), via higher layers of software (such as for instance the application software which controls both the source and the sink, etc.)

In yet other variants, processor may implicitly determine scrambling capabilities based on ongoing communications. For example, certain technologies may provide known symbols at regular intervals or associated with prescribed events.

If scrambling can be enabled/disabled, the device may be further configured to negotiate one or more scrambling parameters for a connection, otherwise, the processor will default to legacy operation. Thereafter, the device is configured to transact data over the connection (either with or without scrambling enabled).

It will be readily appreciated by those of ordinary skill that different combinations and/or variations of the foregoing can be made depending on the desired application and performance attributes.

It will be recognized that while certain embodiments of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles, and the scope of the present disclosure should be determined with reference to the claims.

What is claimed is:

1. A sink device comprising:
an audio-visual interface in data communication with a source device, the audio-visual interface configured to receive a clock signal at either a first amplitude or a second amplitude that is lower than the first amplitude;
a register accessible via the audio-visual interface wherein one or more contents of the register are configured to identify one or more supported scrambling capabilities for the sink device;
logic configured to recover the clock signal having the second amplitude when the source device enables a scrambling functionality of the one or more supported scrambling capabilities; and
logic configured to recover the clock signal having the first amplitude when the scrambling functionality of the one or more supported scrambling capabilities are not enabled.

2. The sink device of claim 1, wherein the clock signal does not exceed a first data rate when the scrambling functionality of the one or more supported scrambling capabilities are not enabled.

3. The sink device of claim 2, wherein the clock signal exceeds the first data rate when the scrambling functionality of the one or more supported scrambling capabilities are enabled.

4. The sink device of claim 1, further comprising a second register accessible via the audio-visual interface, wherein one or more contents of the second register are configured to identify when the one or more supported scrambling capabilities are enabled.

5. The sink device of claim 1, further comprising a second register accessible via the audio-visual interface, wherein one or more contents of the second register causes a selection of the scrambling functionality from the one or more supported scrambling capabilities.

6. The sink device of claim 1, wherein the scrambling functionality is configured to reduce electro-magnetic interference (EMI) characteristics of the clock signal.

7. The sink device of claim 1, wherein the one or more scrambling parameters comprise one or more of (i) a scrambling capability supported by the sink device and (ii) a duration of scrambling configured to be performed by the sink device.

8. A computerized apparatus comprising:
a data interface configured to be in data communication with a source device and a processor apparatus; and
a non-transitory computer-readable apparatus comprising a storage medium, the storage medium having a computer program stored thereon, the computer program comprising a plurality of instructions that are configured to, when executed by the processor apparatus, cause the processor apparatus to:
evaluate whether a scrambling functionality may be enabled on the source device;
in response to a determination that the scrambling functionality may not be enabled, cause transmission of a clock signal over the network interface at an amplitude associated with legacy operation; and
in response to a determination that the scrambling functionality may be enabled, negotiate a scrambling parameter with the source device, and cause transmission of the clock signal over the network interface at a reduced amplitude relative to the amplitude associated with the legacy operation.

9. The computerized apparatus of claim 8, wherein the plurality of instructions are further configured to, when executed by the processor apparatus, cause the processor apparatus to:
enable scrambling on the computerized apparatus in response to the determination that the scrambling functionality may be enabled on the source device.

10. The computerized apparatus of claim 8, wherein the transmission of the clock signal at the reduced amplitude comprises a transmission of the clock signal so as to reduce an electro-magnetic interference (EMI) characteristic of the clock signal via the scrambling functionality.

11. The computerized apparatus of claim 8, wherein the plurality of instructions are further configured to, when executed by the processor apparatus, cause the processor apparatus to:
subsequent to the evaluation of whether the scrambling functionality on the computerized apparatus may be enabled, reevaluate whether the scrambling functionality on the computerized apparatus may be enabled based on detection of a change in an operating mode.

12. The computerized apparatus of claim 8, wherein the plurality of instructions are further configured to, when executed by the processor apparatus, cause the processor apparatus to:
in response to the determination that the scrambling functionality may be enabled, enable scrambling in periodic intervals, allow determination of whether the scrambling is enabled based on a rate of receipt of unscrambled characters.

13. The computerized apparatus of claim 8, wherein the plurality of instructions are further configured to, when executed by the processor apparatus, cause the processor apparatus to:
enable the scrambling functionality in response to a determination that a rate of transmission over the data interface exceeds a threshold.

14. The computerized apparatus of claim 8, further comprising a register;
wherein the plurality of instructions are further configured to, when executed by the processor apparatus, cause the processor apparatus to read data on the register to evaluate whether the scrambling functionality may be enabled on the source device.

15. A computerized apparatus comprising:
a data interface configured to be in data communication with another computerized apparatus and a processor apparatus; and
a non-transitory computer-readable apparatus comprising a storage medium, the storage medium having a computer program stored thereon, the computer program comprising a plurality of instructions that are configured to, when executed by the processor apparatus, cause the processor apparatus to:
receive data representative of an indication that the other computerized apparatus is configured to support scrambling operation;
responsive to the indication, determine whether a scrambling functionality may be enabled on the computerized apparatus;
responsive to the scrambling functionality not being enabled on the computerized apparatus:
cause the other computerized apparatus to disable the scrambling operation; and
transmit a clock signal at a first amplitude; and responsive to the scrambling functionality being enabled on the computerized apparatus, transmit a clock signal to the other computerized apparatus at a second amplitude, the second amplitude being less than the first amplitude, the transmission of the clock signal at the second amplitude configured to cause a reduction of electro-magnetic interference (EMI) of the clock signal during the transmission of the clock signal as compared with transmission of the clock signal at the first amplitude.

16. The computerized apparatus of claim 15, wherein the transmission of the clock signal to the other computerized apparatus at the second amplitude is performed responsive to a change in a display resolution associated with the data communication.

17. The computerized apparatus of claim 15, wherein the indication that the other computerized apparatus is configured to support scrambling operation is advertised by the other computerized apparatus.

18. The computerized apparatus of claim 15, wherein the computerized apparatus comprises a source device, and the other computerized apparatus comprises a sink device configured to receive scrambled and non-scrambled transmissions from the source device.

19. The computerized apparatus of claim 15, wherein the clock signal does not exceed a first data rate responsive to the scrambling functionality not being enabled.

20. The computerized apparatus of claim 15, wherein the clock signal exceeds the first data rate responsive to the scrambling functionality being enabled.

* * * * *